United States Patent
Koo et al.

[11] Patent Number: 5,956,367
[45] Date of Patent: Sep. 21, 1999

[54] RAKE RECEIVING APPARATUS FOR DIRECT SEQUENCE CODE DIVISION MULTIPLE ACCESS SYSTEM

[75] Inventors: Jun Mo Koo, Seoul; Je Woo Kim, Kyongki-Do; Jin Ick Lee, Seoul, all of Rep. of Korea

[73] Assignee: SK Telecom Co., Ltd, Seoul, Rep. of Korea

[21] Appl. No.: 08/832,791

[22] Filed: Apr. 4, 1997

[30] Foreign Application Priority Data

Apr. 4, 1996 [KR] Rep. of Korea ............ 96-10299

[51] Int. Cl.[6] .................. H04B 15/00; H04K 1/00; H04L 27/30
[52] U.S. Cl. .................. 375/206; 370/335; 370/342
[58] Field of Search .................. 375/206, 200, 375/267, 347, 349, 348, 367, 202, 207, 208; 370/335, 342, 350, 441, 515

[56] References Cited

U.S. PATENT DOCUMENTS 4,984,247  1/1991  Kaufmann et al. .............. 375/200
5,671,221  9/1997  Yang ............................ 370/18

*Primary Examiner*—Jason Chan
*Assistant Examiner*—Jean B Corrielus
*Attorney, Agent, or Firm*—Merchant, Gould, Smith, Edell, Welter & Schmidt, P.A.

[57] ABSTRACT

A rake receiving apparatus used in communication systems using a DS/CDMA (direct sequence code division multiple access) system, wherein a single demodulating finger is used for a plurality of multipath signals, thereby being capable of not only greatly reducing the complexity of its demodulators, but also achieving an improvement in performance where a large number of multipaths are used. The apparatus includes a searcher for extracting the phases of pseudo noise codes searcher for pseudo corresponding in number to existing multipaths, a combiner controlling unit for selecting those of the phase values from the searcher to be combined together, a combiner for combing selected phase values together, a pseudo noise code generator for generating pseudo noise codes, a demodulator for reversely sequencing its input signal using the output from the pseudo noise code generator, thereby recovering data, and a synchronization tracer for controlling the pseudo noise code generator such that the pseudo noise code phase of the pseudo noise code generator coincides with the pseudo noise code phase of the input signal at the synchronization tracer.

11 Claims, 7 Drawing Sheets

RAKE RECEIVING APPARATUS FOR DIRECT SEQUENCE CODE DIVISION MULTIPLE ACCESS SYSTEM

BACKGROUND OF THE INVENTION

1. Field of the Invention

The present invention relates to a code division multiple access (CDMA) system, and more particularly to a rake receiving apparatus used in communication systems using a direct sequence CDMA (DS/CDMA) system.

2. Description of the Prior Art

Generally, such a rake receiving apparatus is known to provide an improvement in performance as compared to cases wherein a single demodulator is used. The rake receiving apparatus operates to detect the phases of pseudo noise (PN) codes of signals respectively corresponding to multipaths by use of a searcher. The signals from the multipaths are demodulated in corresponding independent demodulators by use of a plurality of demodulating fingers as receivers, corresponding in number to the multipaths, respectively. The results obtained from the receivers after the demodulation are coupled together in a combiner to extract desired timing information and demodulated data. Thus, the rake receiving apparatus can obtain an improvement in performance, as compared to cases using a single demodulator.

Referring to FIG. 1, a conventional arrangement of such a rake receiving apparatus is illustrated. As shown in FIG. 1, the rake receiving apparatus includes a single searcher, a plurality of demodulating fingers and a post-processing combiner (adapted to extract demodulation data, timing information and frequency information). In this rake receiving apparatus, the searcher first searches for the phases of PN codes corresponding to nultipaths. Based on the result of the operation of the searcher, the demodulating fingers carry out their demodulation operations. The demodulating fingers operate individually to demodulate signals associated therewith. The combiner combines the results of the modulation operations respectively carried out in the demodulating fingers, thereby extracting required data and timing information. Since each finger must execute the whole procedure revired for a reverse sequence process, such a rake receiving apparatus using N receivers achieves an improvement in performance as compared to the demodulating method using a single receiver. In this case, however, there is a problem in that the complexity of hardware increases N times or above.

Meanwhile, systems with as fixed number of fingers involve a problem in that they can not demodulate signals from multipaths which are more than the given number of fingers.

SUMMARY OF THE INVENTION

Therefore, an object of the invention is to solve the above-mentioned problems encountered in the prior art and to provide a rake receiving apparatus used in communication systems using a DS/CDMA system, which is capable of not only greatly reducing the complexity of its demodulators, but also having a freedom enabling a combining of all signals from multipaths.

In accordance with the present invention, this object is accomplished by providing a rake receiving apparatus for a direct sequence code division multiple access communication system comprising: a radio frequency receiving unit for receiving a radio frequency signal via an antenna and converting the received radio frequency signal into an intermediate frequency signal; analog/digital converting means for converting the analog signal, which is the intermediate frequency signal from the radio frequency receiving unit, into a digital signal; digital down-converting means for frequency-down-converting the digital signal received from the analog/digital converting means into a baseband signal; sample delay means for receiving the output signal from the digital down-converting means, and sequentially outputting the receiving output signal while delaying it a predetermined time interval; first pseudo noise code generating means for generating pseudo noise codes and outputting them; searching means for receiving the digital signal from the analog/digital converting means and the pseudo noise codes from the first pseudo noise code generating means, thereby outputting pseudo noise code phases respectively corresponding to multipaths; combiner controlling means for receiving the output signal from the searching means, thereby outputting a signal adapted to select those, to be combined together, of the signals sequentially output from the sample delay means; sample selecting means for receiving the signals sequentially output from the sample delay means as well as the output signal from the combiner controlling means and selectively outputting the signals received from the sample delay means based on the signal received from the combiner controlling means; a combiner for receiving the signals selectively output from the sample selecting means and combining them; second pseudo noise code generating means for receiving the output signal from the combiner controlling means, thereby generating pseudo noise codes; demodulating means for receiving the output signal from the second pseudo noise code generating means as well as the output signal from the combiner means, thereby demodulating data and outputting the demodulated data; and synchronization tracking means for receiving the output signal from the second pseudo noise code generating means as well as the output signal from the combiner means, thereby recovering a synchronization of the pseudo noise codes generated from the first pseudo noise generating means.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
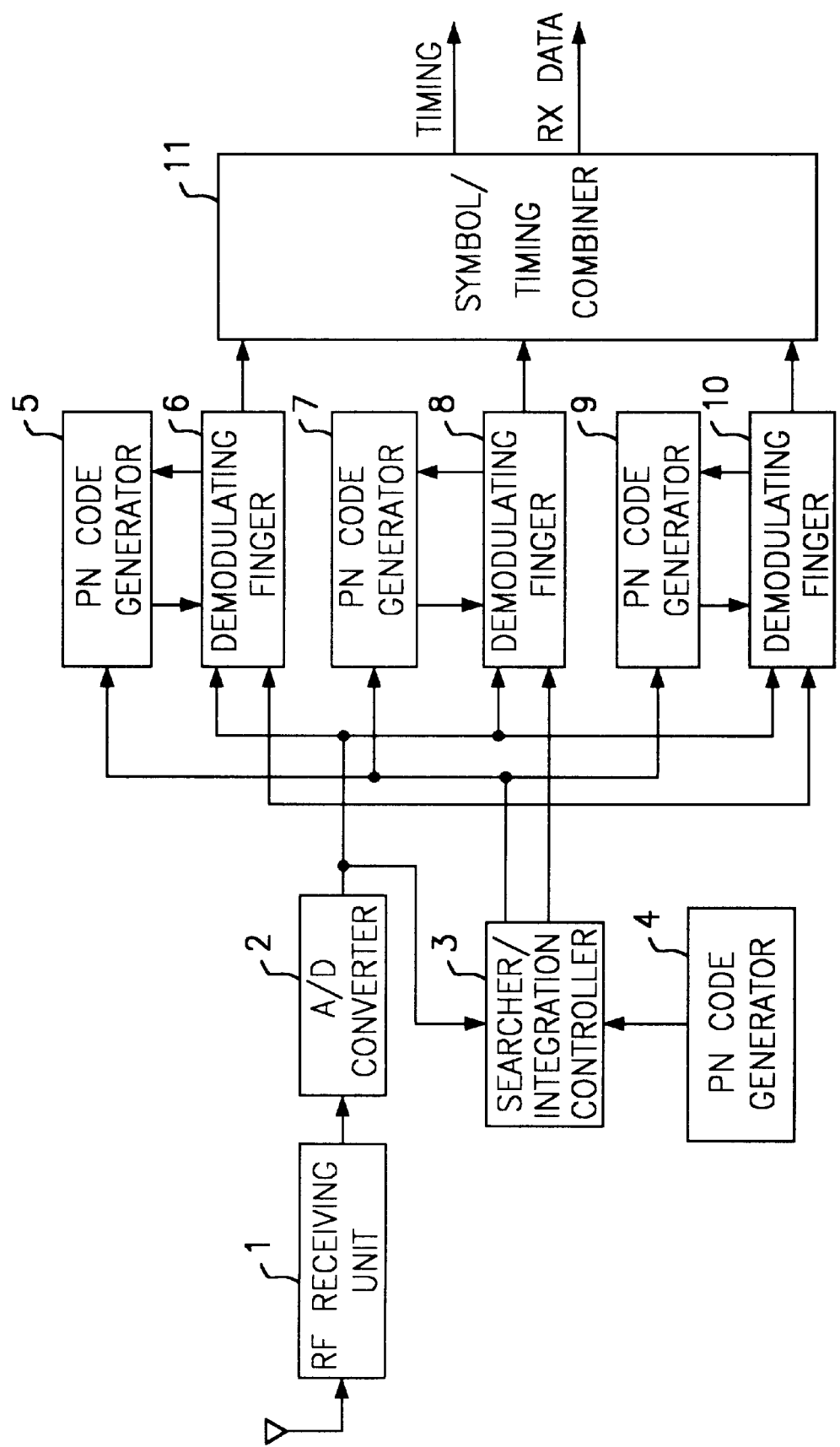
FIG. 1 is a block diagram illustrating a conventional rake receiving apparatus.
Figure 2:
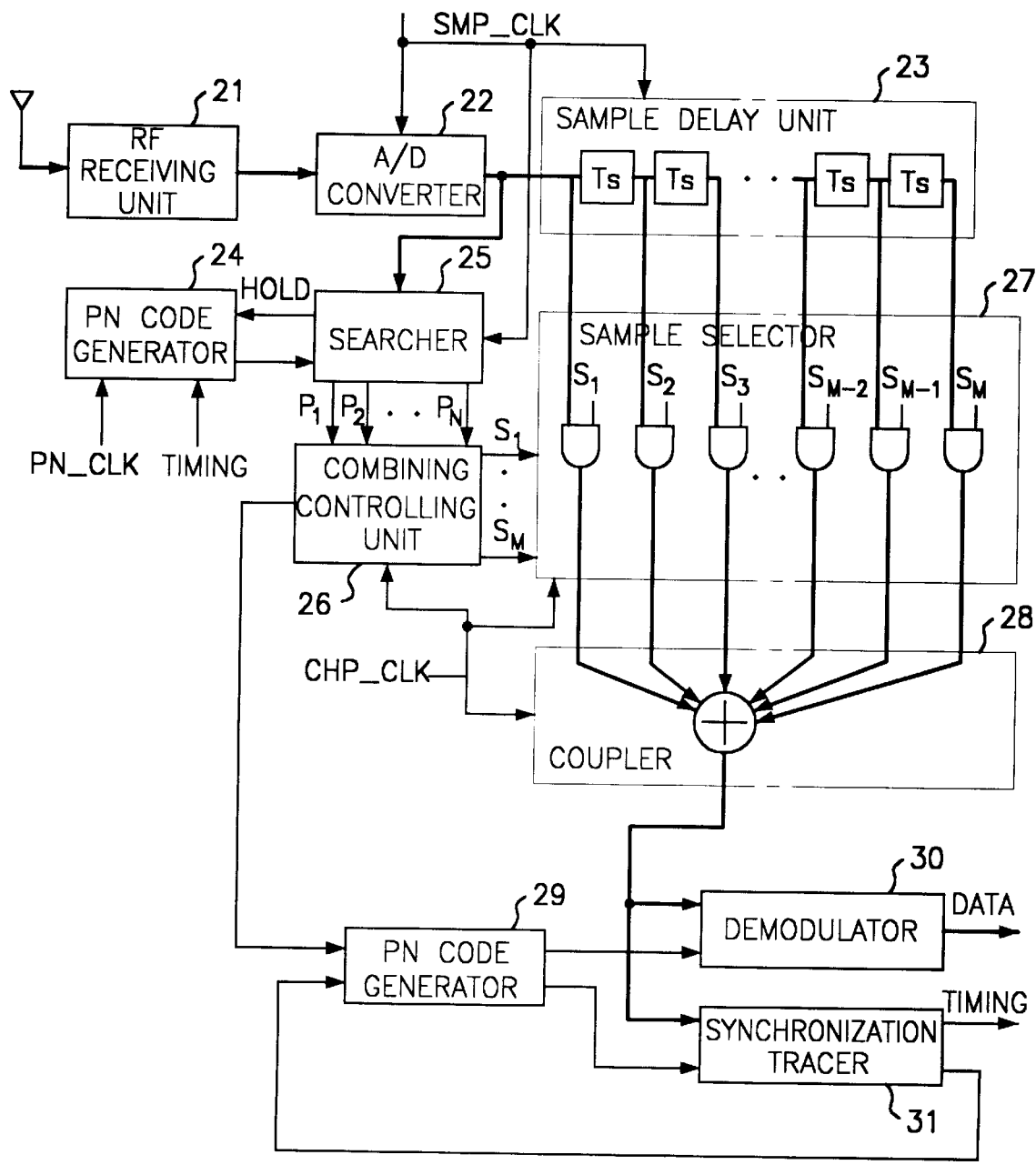
FIG. 2 is a block diagram illustrating a binary phase shift keying (BPSK) rake receiving apparatus in accordance with an embodiment of the present invention.

FIG. 2 illustrates a BPSK rake receiving apparatus in accordance with an embodiment of the present invention.

In FIG. 2, the thick lines indicate flows of input or output signals whereas the thin lines indicate flows of control signals or clock signals. Also, "SMP_CLK" and "CHP_CLK" indicate a sampling clock and a chip timing clock, respectively.

The rake receiving apparatus according to the present invention carries out a combining process inverting from that of the above-mentioned conventional rake receiving apparatus.

Actually, the combiner of the rake receiving apparatus according to the present invention consists of operators executing an addition operation whereas the demodulator of the rake receiving apparatus consists of a combination of operators executing a multiplication operation and operators executing an addition operation. Both the operator executing the combining process and the operator executing the demodulation process are linear operators. Accordingly, even when these two processes are changed from each other, arithmetically equivalent results are obtained. In other words, they may be exchanged in that the law of exchange is established between the combining process and the demodulation process because all operators executing those processes are linear operators, The present invention utilizes such an exchange scheme to reduce the complexity of hardware while obtaining a freedom enabling a combining of a required number of signals from multipaths.

In other words, the reverse sequence and demodulation processes are required only one time in accordance with the present invention, as compared to the fact that they are required a number of times corresponding to the number of signals from multipaths to be processed in accordance with the conventional system.

As shown in FIG. 2, the rake receiving apparatus of the present invention includes a radio frequency (RF) receiving unit 21 which receives an RF signal through an antenna and converts it into a baseband signal.

An analog/digital (A/D) converter 22 is coupled to the output of the RF receiving unit 21. The A/D converter 22 receives the baseband signal output from the RF receiving unit 21 and carries out an oversampling for taking a required number of samples per PN chip.

To the A/D converter 22, a searcher 25 is coupled, which receives an output signal from the A/D converter 22 and extracts the phases of PN codes corresponding in number to multipaths existing for a period of time corresponding to a data interval of 1 bit (the number of PN chips corresponding to a processing gain (PG)).

A combiner controlling unit 26 is connected to the searcher 25 to generate select signals $S_1, S_2, \ldots,$ and $S_M$ for selecting those of the phase values $P_1, P_2, \ldots,$ and $P_N$ from the searcher 24 to be coupled together. The combiner controlling unit 26 sends the selected signals $S_i$ (i=1, 2, ..., and M) to a sample selector 27 which, in turn, selects samples respectively corresponding to the existing multipaths using the received signals $S_i$. For example, when a select signal $S_i$ has a logic value of 1 ($S_i$=1), a corresponding sample signal is selected from input signals latched by a sample delay unit 23. The selected sample signal is then sent to the combiner 28 which, in turn, uses it. On the other hand, when the select signal $S_i$ has a logic value of 0 ($S_i$=0), the combiner 28 does not use the sample signal selected by the select signal.

Although the number of signals combined by the combiner 28 depends on the dispersion delay of signals, it may correspond to substantially ten chips or less. Assuming that the maximum dispersion delay corresponds to L chips while the number of samples per chip is K, the number of sample delays corresponds to "L×K". The resultant signal obtained by combining or adding signals together in the combiner 28 is applied to a demodulator 30 and a synchronization tracer 31.

A PN code generator 29 is coupled between the combiner control unit 26 and demodulator 29. The initial phase of the PN code generator 29 is given by the combiner control unit 26. This value is determined taking into consideration multipath signals. In accordance with the present invention, the initial phase is taken with reference to the latest one of multipath signals.

The demodulator 30 serves to reversely sequence its input signal using the output from the PN code generator 30, thereby recovering data.

The synchronization tracer 31 derives respective correlation values between its input signal from the combiner 28 and early/late signals sequentially output from the PN code generator 29. Based on these correlation values, the synchronization tracer 31 carries out a clock control for the PN code generator 29. That is, the synchronization tracer 31 controls the PN code generator 29 such that the PN code phase of the PN code generator 29 coincides with the PN code phase of the input signal at the synchronization tracer 31.

Figure 3:
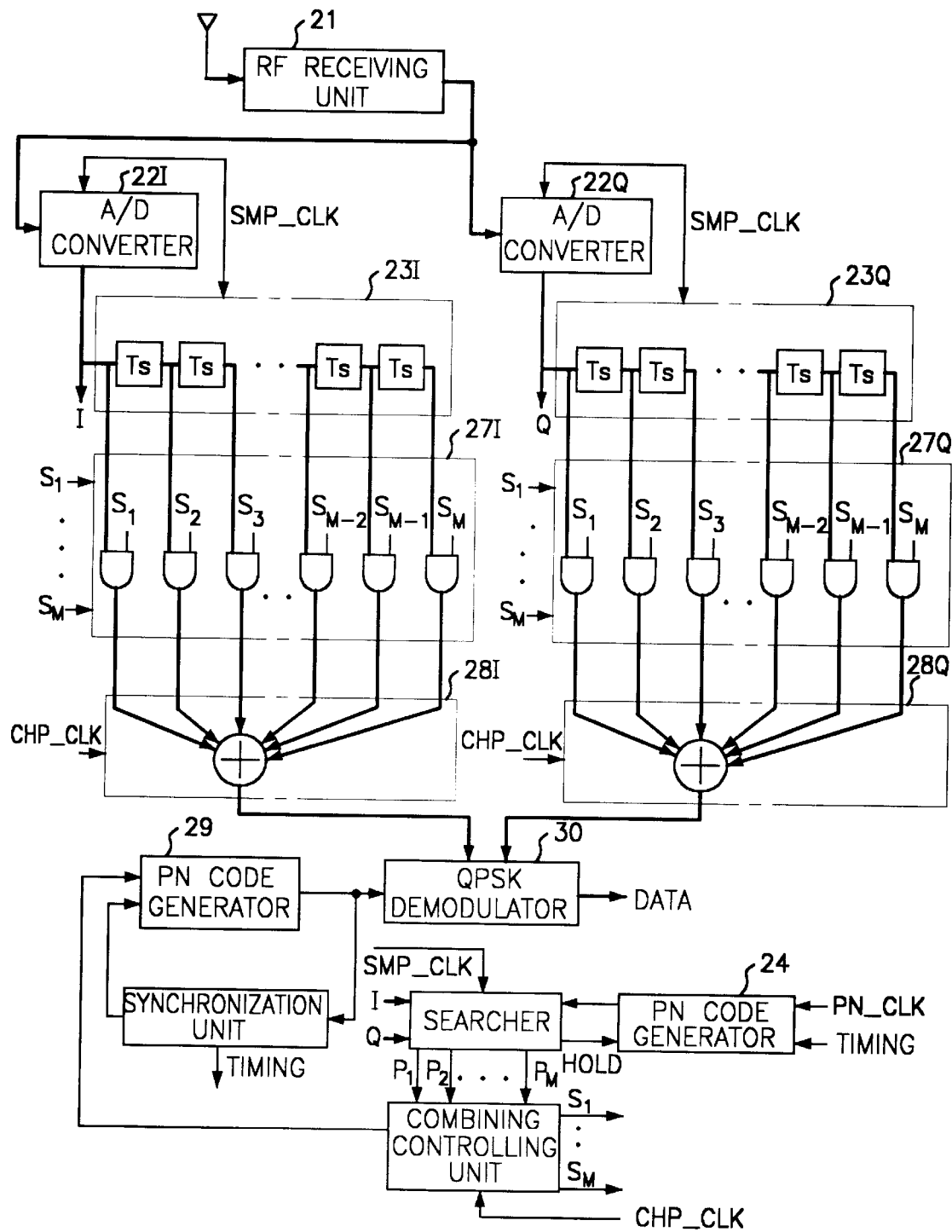
FIG. 3 is a block diagram illustrating a quadrature phase shift keying (QPSK) rake receiving apparatus in accordance with another embodiment of the present invention.

FIG. 3 is a block diagram illustrating a QPSK rake receiving apparatus in accordance with another embodiment of the present invention.

In FIG. 3, elements respectively corresponding to those of the BPSK rake receiving apparatus in FIG. 2 are denoted by the same reference numerals.

As shown in FIG. 3, the QPSK rake receiving apparatus includes an RF receiving unit 21 which receives an RF signal through an antenna. The RF receiving unit 21 converts the received RF signal into a baseband signal which is, in turn, divided into an inphase (I) signal and a quadrature (Q) signal.

In order to individually process the I and Q signals, the rake receiving apparatus includes a pair of A/D converters 22I and 22Q, a pair of sample delay units 23I and 23Q, a pair of sample selectors 27I and 27Q and a pair of combiners 28I and 28Q. By such an arrangement, the I and Q signals are individually converted into digital signals. Each digital signal is then sequentially processed by the associated sample delay unit and sample selector. The entire operation of the QPSK rake receiving apparatus is the same as that of the BPSK rake receiving apparatus except that the output from the RF receiving unit 21 is divided into I and Q signals to be individually processed. Accordingly, no detailed description of the apparatus shown in FIG. 3 will be made.

Figure 4:
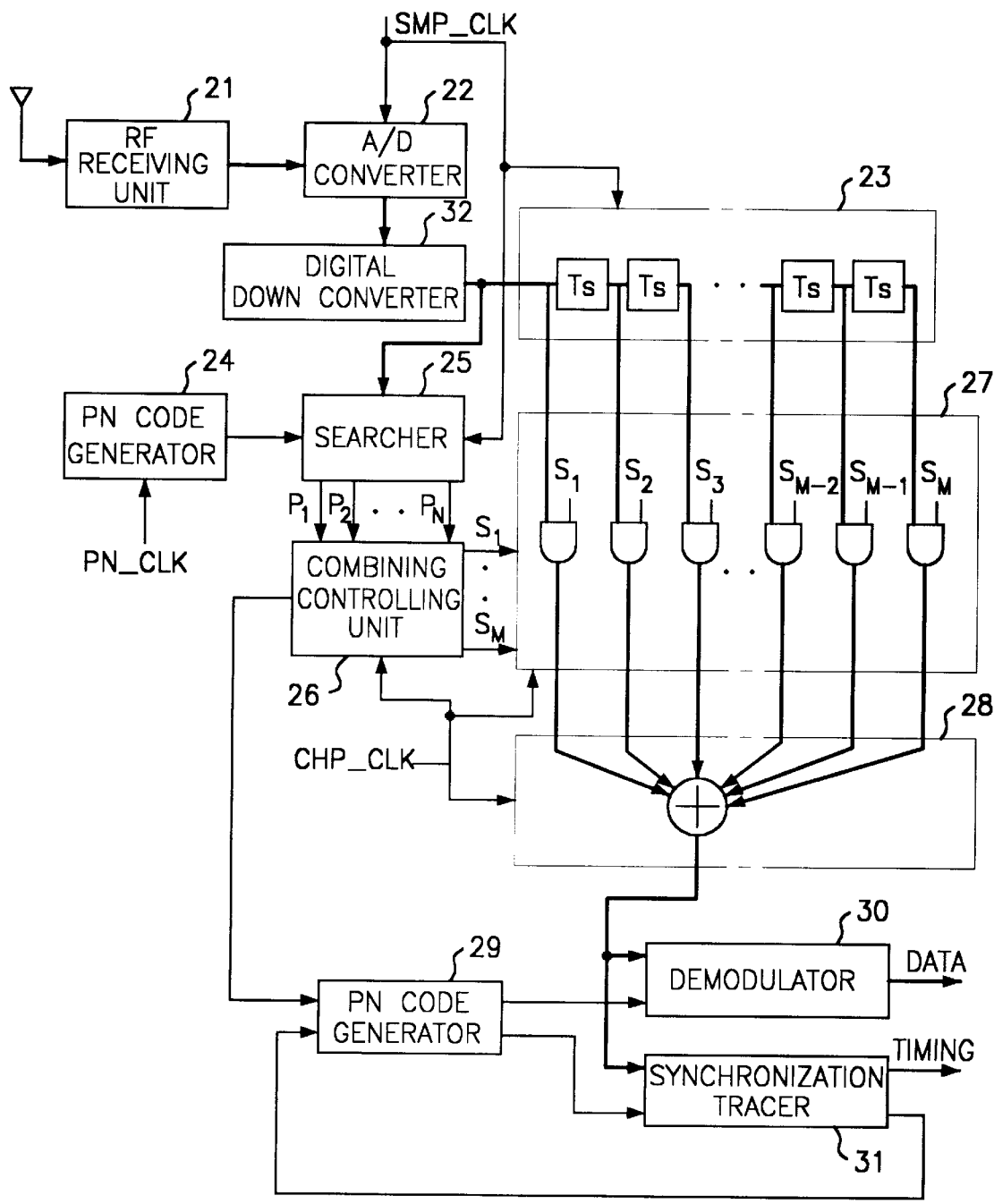
FIG. 4 is a block diagram illustrating a rake receiving apparatus in accordance with another embodiment of the present invention.

FIG. 4 is a block diagram illustrating a rake receiving apparatus in accordance with another embodiment of the present invention. In FIG. 4, elements respectively corresponding to those in FIG. 2 are denoted by the same reference numerals.

As shown in FIG. 4, the rake receiving apparatus includes an RF receiving unit 21 which receives an RF signal through an antenna. The RF receiving unit 21 converts the receivid RF signal into an intermediate frequency signal, as different from those of the above-mentioned embodiments.

The output signal from the RF receiving unit 21, which is in the form of an analog signal, is applied to an A/D converter 22. The A/D converter 22 converts the received analog signal into a digital signal which is, in turn, sent to a digital downconverter 32. The digital itermediate frequency signal is converted into a baseband signal and then applied to a searcher 25 and a sample delay unit 23. Subsequent operations of the rake receiving apparatus according to this embodiment are the same as those according to the above-mentioned embodiments.

Where this embodiment is applied to make a QPSK rake receiving apparatus (not shown), there is an advantage that the complexity of hardware can be reduced.

In such a QPSK rake receiving apparatus wherein an input RP signal is converted into a baseband signal and then divided into I and Q signals, it is required to use A/D converters, sample delay units, sample selectors and combiners in pairs to individually process the I and Q signals. Due to such a requirement, the number of elements used for the QPSK rake receiving apparatus increases. In accordance with this embodiment of the present invention, however, it is possible to reduce the complexity of hardware because the QPSK rake receiving apparatus can be made using a single chip.

Figure 5:
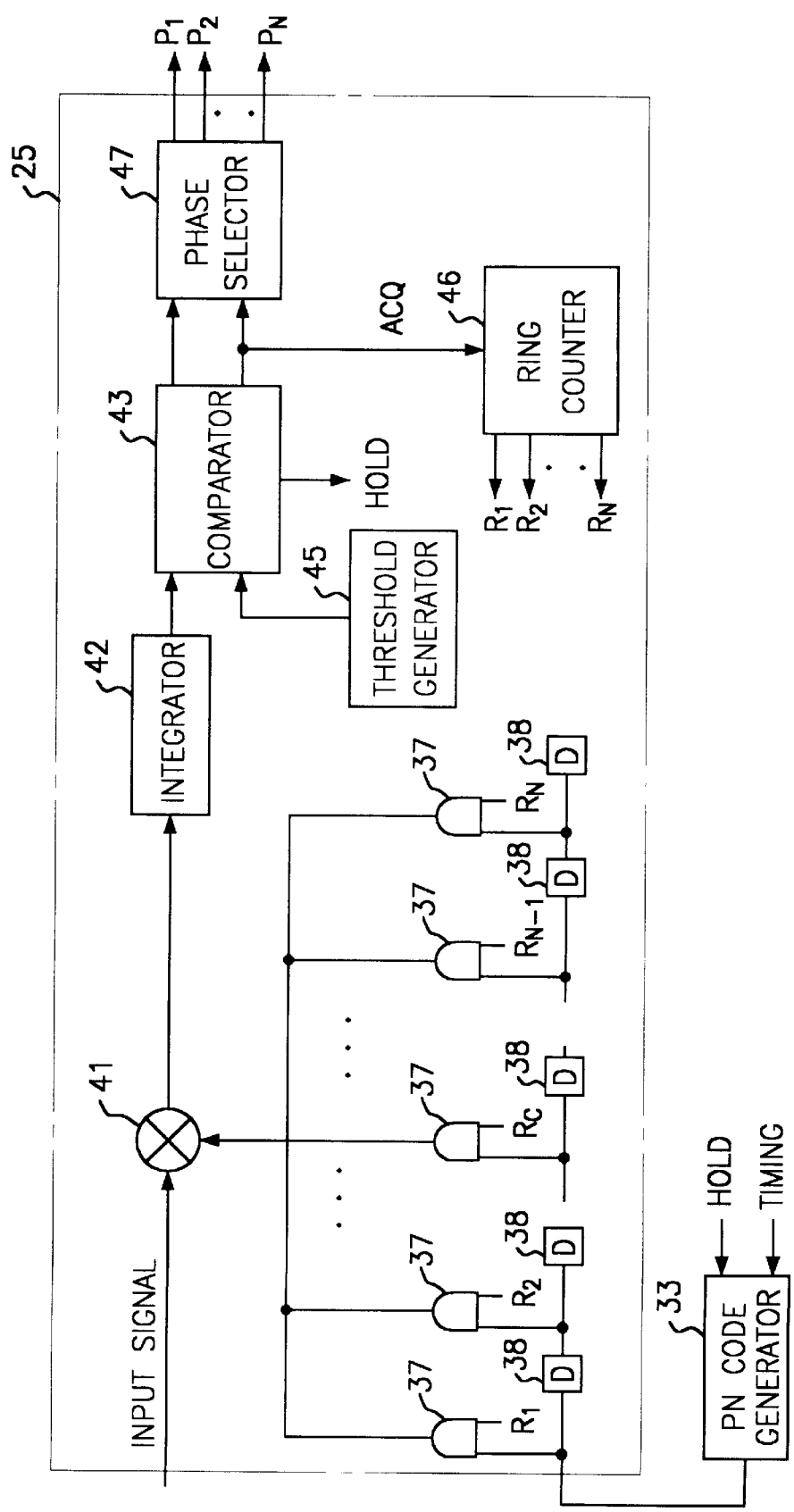
FIG. 5 is a block diagram illustrating a searcher according to an embodiment of the present invention.

FIG. 5 is a block diagram illustrating a searcher according to an embodiment of the present invention.

As shown in FIG. 5, the searcher includes a plurality of delay units which are connected to a PN code generator 33 in series to respectively delay an output from the PN code generator 33 by incrementing hold values. A plurality of AND gates are also connected to the PN code generator 33. The first one of the AND gates is directly coupled at its one input to the output of the PN code generator 33 whereas the remaining AND gates are coupled to respective nodes between adjacent delay units. The searcher also includes a multiplier 41 for multiplying an input signal received to the searcher by the output from the PN code generator 33, thereby reversely sequencing the input signal. An integrator 42 is coupled to the multiplier 41 to integrate successive output signals from the multiplier 41 for a predetermined period of time. A comparator 43 is connected at its one input to the integrator 42. The other input of the comparator 43 is coupled to a threshold generator 45. The comparator 43 compares the output from the integrator 42 with a threshold value generated from the threshold generator 45, thereby outputting a hold signal HOLD or a synchronization acquiring signal ACQ based on the result of the comparison. A ring counter 46 is coupled to the comparator 43 to receive the synchronization acquiring signal ACQ. The ring counter 46 is also coupled at each output thereof to the other input of each AND gate. The ring counter 46 outputs a logic value of 1, (one), at a selected output terminal thereof while outputting a logic value of 0 at the remaining output terminals thereof at every integration interval of the integrator 42 in order to reversely sequence the input signal with a selected one of PN codes respectively having different delay values at every integration interval. The PN code generator is connected to the comparator 43 to reqeive the hold signal HOLD from the comparator 43. To the comparator 43, a phase selector 47 is coupled to selectively receive the output from the integrator 42 through the comparator 43 based on the result of the comparison carried out by the comparator 43 along with the synchronization acquiring signal ACQ. Based on the received signals, the phase selector 47 outputs selected phase values respectively corresponding to desired multipaths.

Now, the operation of the searcher will be described in more detail in conjunction with FIG. 5.

The operation of the searcher denoted by the reference numeral 25 is mainly divided into two procedures, namely, a synchronization acquiring procedure and a searching procedure.

The synchronization acquiring procedure is a procedure of making the PN sequence included in the input signal applied to the searcher coincide with an internally generated PN sequence within a ½ chip. During the synchronization acquiring procedure, the ring counter 46 applies a logic value of 1, (one), to a selected AND gate 37, for example, the AND gate 37 which receives the output signal Rc from the ring counter 46. The remaining output signals of the ring counter 46 applied to the remaining AND gates 37 are fixed to have a logic value of 0, (zero). In this case, a PN sequence with PN codes delayed by a delay value given by c delay units 38. The multiplier 41 multiplies the input signal applied to the searcher by the output signal from the AND gate 37 associated with the signal Rc, thereby reversely sequencing the input signal. The integrator 42 then integrates successive output signals from the multiplier 41 for a predetermined period of time. The integrated value from the integrator 42 is compared with a threshold value generated from the threshold generator 45 by the comparator 33. When the integrated value is less than the threshold value, the comparator 43 generates a hold signal HOLD, thereby delaying the generation of PN codes from the PN code generator 33 by a delay value corresponding to a ½ chip. Thereafter, the above procedure is repeated. On the other hand, when the integrated value is not less than the threshold value, it is determined that a desired synchronization has been acquired. In this case, the comparator 33 generates a synchronization acquiring signal ACQ. The procedure then proceeds to the searching procedure.

In the searching procedure, the ring counter 46 outputs a logic value of 1, (one), at a selected output terminal thereof while outputting a logic value of 0, (zero), at the remaining output terminals thereof at every integration interval of the integrator 42. Accordingly, the input signal is reversely sequenced with a selected one of PN codes respectively having different delay values at every integration interval. The reversely sequenced signal values are integrated in the integrator 42 and then compared with the threshold value in the comparator 43. When the integrated value is not less than the threshold value, the comparator 43 sends the integrated value to the phase selector 47 which, in turn, compares the received integrated value with the value already calculated in association with other delay value, thereby selecting and outputting phase values corresponding in number to desired multipaths.

Figure 6:
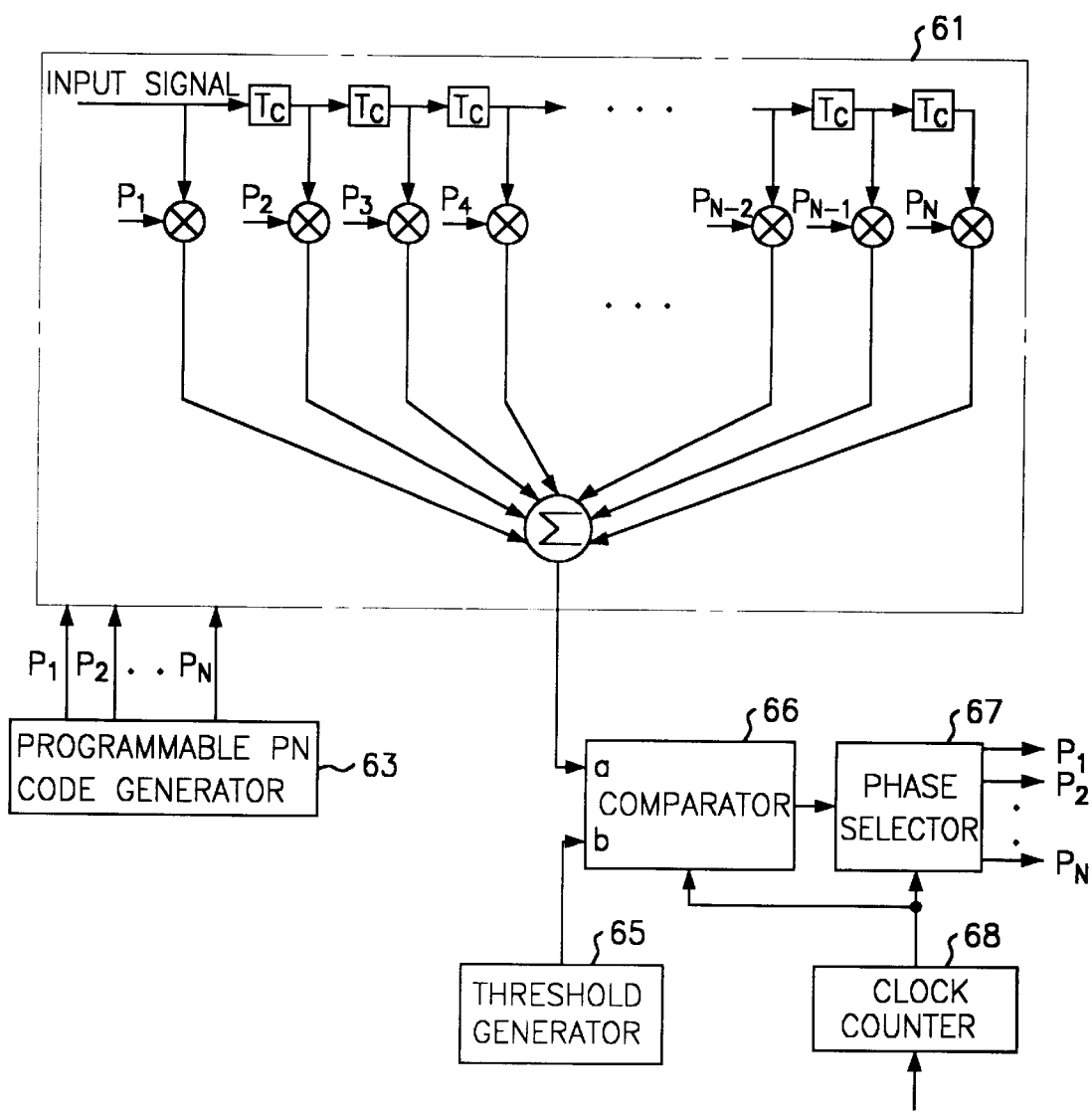
FIG. 6 is a block diagram illustrating a searcher according to another embodiment of the present invention.

FIG. 6 is a block diagram illustrating a searcher according to another embodiment of the present invention. Although the embodiment of FIG. 5 provides a searcher using an active correlator, this embodiment provides a searcher using a passive correlator. Such a passive correlator uses a programmable matched filter.

As shown in FIG. 6, the searcher includes a programmable matched filter 61 and a programmable PN code generator 63. The programmable matched filter 61 includes a plurality of multipliers serving to respectively multiply different delay components of an input signal applied to the searcher by desired PN codes generated from the programmable PN code generator 63. The desired PN codes are generated by controlling the programmable PN code generator 63. The programmable matched filter 61 also includes a combiner which combines outputs from the multipliers. The output from the combiner is used as the output from the programmable matched filter 61. The output signal from the programmable matched filter 61 is sent to a comparator 66 which also receives a threshold value output from a threshold generator 65. The comparator 66 serves to compare the output signal from the programmable matched filter 61 with the threshold value. A phase selector 67 is coupled to the comparator 66. When the output signal from the programmable matched filter 61 is not less than the threshold value, a corresponding PN code value is applied to the phase selector 67 which also receives an output signal from a clock counter 68.

In this case, it is possible to rapidly acquire an initial synchronization as compared to the case using the active correlator. It is also possible to extract phase components of PN codes respectively corresponding to multipaths for every sample. The programmable matched filter 61 consists of a well-known matched filter construction with a function of controlling PN codes. Other operations of the searcher are the same as those of the searcher using the active correlator.

As apparent from the above description, the operation of the rake receiving apparatus according to the present invention is updated for every PN code interval so as to effectively reflect a variation in the input signal applied thereto.

Figure 7:
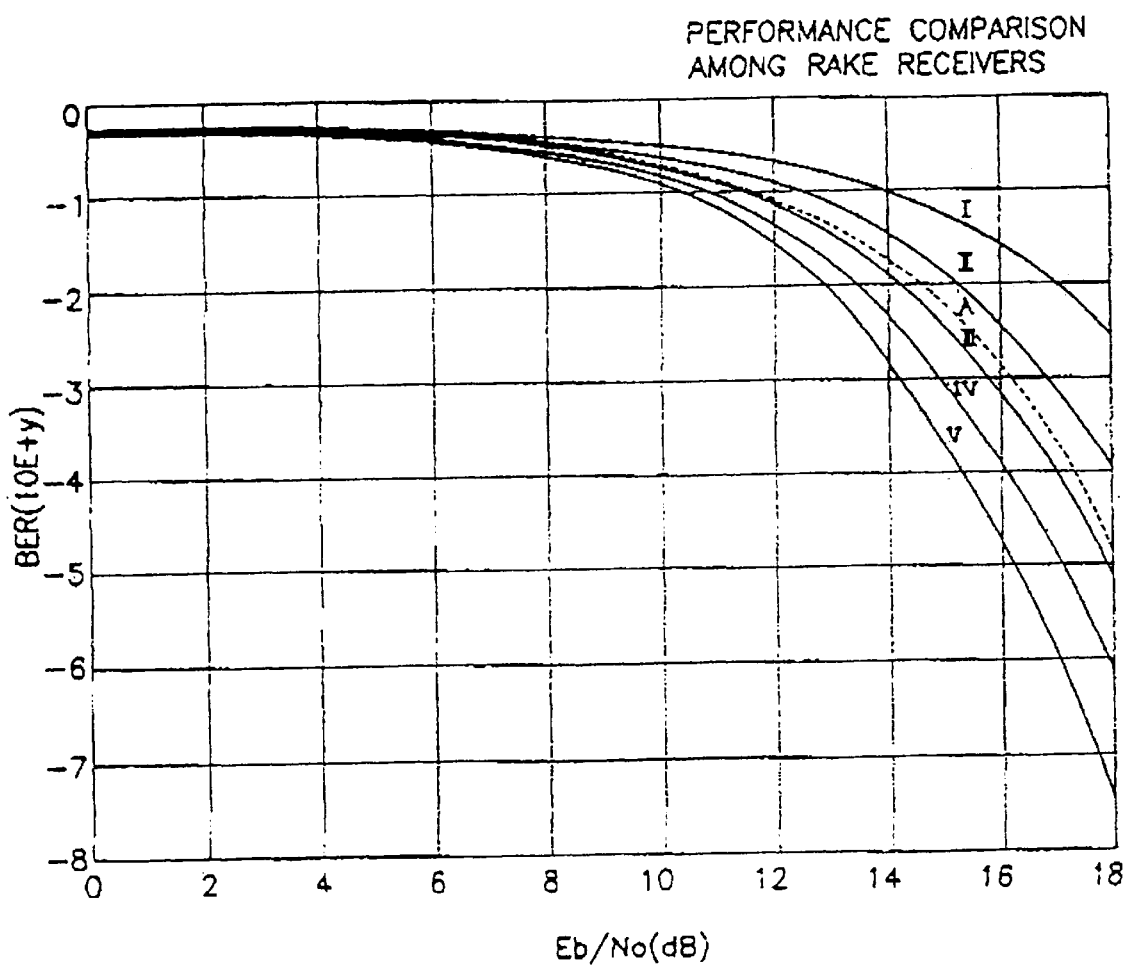
FIG. 7 is a graph depicting the result of a computer simulation carried out to verify the performance of the rake receiving apparatus according to the present invention.

FIG. 7 is a graph depicting the result of a computer simulation carried out to verify the performance of the rake receiving apparatus according to the present invention.

The computer simulation was carried out using a processing gain of 64 while giving 5 multipaths and assuming that signals to be combined together have the same intensity.

In FIG. 7, graphs I to V show the results obtained from the rake receiving apparatus of the present invention while incrementing the number of signals to be combined from one to five. On the other hand, the graph A shows the result obtained from a conventional rake receiving apparatus using three fingers. By referring to FIG. 7, it can be found that where the number of signals to be combined is three or more, the energy used per bit in the rake receiving apparatus of the present invention is considerably smaller than that in the conventional rake receiving apparatus at the same bit error rate (BER). For example, the conventional rake receiving apparatus requires an Eb/No of about 16 dB for obtaining a BER of $10^{-3}$. However, the rake receiving apparatus of the present invention needs about 14 dB for obtaining the same BER when five signals are combined. In this case, therefore, the apparatus of the present invention provides an electric power saving effect of about 2 dB.

As apparent from the above description, the present invention provides a rake receiving apparatus using a single demodulating finger for a plurality of multipath signals. Accordingly, the rake receiving apparatus can achieve a reduction in the complexity of hardware as compared with the conventional rake receiving apparatus. The apparatus of the present invention can provide an effect of easily improving performance even when a large number of multipaths are used.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A rake receiving apparatus for a direct sequence code division multiple access communication system comprising:

a radio frequency receiving unit for receiving a radio frequency signal via an antenna and converting the received radio frequency signal into a baseband signal;

analog/digital converting means for converting the analog signal, which is the baseband signal from the radio frequency receiving unit, into a digital signal;

first pseudo noise code generating means for generating and outputting pseudo noise codes;

searching means for receiving the digital signal from the analog/digital converting means and the pseudo noise codes from the first pseudo noise code generating means, thereby outputting pseudo noise code phases respectively corresponding to multipaths;

combiner controlling means for receiving the output signal from the searching means, thereby outputting a signal adapted to have select components combined together from the output signal from the analog/digital converting means;

multipath combiner means for receiving the output signal from the combiner controlling means and the output signal from the analog/digital converting means, selecting multipaths from the output signal from the analog/digital converting means based on the output signal from the combiner controlling means, and combining the selected multipaths;

second pseudo noise code generating means for receiving the output signal from the combiner controlling means, thereby generating pseudo noise codes;

demodulating means for receiving the output signal from the second pseudo noise code generating means and the output signal from the combiner means, thereby demodulating data and outputting the demodulated data; and synchronization tracking means for receiving the output signal from the second pseudo noise code generating means and the output signal from the combiner means, thereby recovering a synchronization of the pseudo noise codes generated from the first pseudo noise generating means.

2. A rake receiving apparatus in accordance with claim 1, wherein the multipath combiner means comprises:

sample delay means for receiving the output signal from the analog/digital converter as a received signal and sequentially outputting output signals while selectively delaying the received signal a predetermined time interval;

sample selecting means for receiving the output signals sequentially output from the sample delay means and the output signal from the combiner controlling means and selectively outputting the output signals received from the sample delay means based on the output signal received from the combiner controlling means; and a combiner for receiving the output signals selectively output from the sample selecting means and combining said output signals.

3. A rake receiving apparatus in accordance with claim 1, wherein the demodulating means comprises a binary phase shift keying demodulator.

4. A rake receiving apparatus in accordance with claim 1, further comprising a second analog/digital converting means arranged in parallel to the first analog/digital converting means and second multipath combining means arranged in parallel to the first multipath combining means, and wherein the demodulating means comprises a quadrature phase shift keying demodulator.

5. A rake receiving apparatus in accordance with claim 1, wherein the searching means comprises:

multiplying means for multiplying the digital signal received from the analog/digital converting means as an input signal of the searching means by the signal generated from the first pseudo noise code generating means to reversely sequence the input signal as a first output signal;

integrating means for integrating first output signals sequentially output from the multiplying means for a predetermined period of time to form a second output signal;

threshold generating means for generating a predetermined threshold value;

comparing means for comparing the second output signal from the integrating means as an integrated value with the predetermined threshold value, and generating a hold signal when the integrated value is less than the threshold value while determining an acquisition of the synchronization when the integrated value is not less than the threshold value;

a plurality of delay means for delaying the pseudo noise codes output from the first pseudo noise code generating means by different delay values to form delayed pseudo noise codes;

ring counter means for outputting third output signals having a logic value of 1 while the remaining signals have a logic value of 0 to select one of the delayed pseudo noise codes, the delayed pseudo noise codes having different delay values by the logic-1 signal at every integration interval so that the input signal can be reversely sequenced with the selected delayed pseudo noise code at every integration interval; and ANDing means for ANDing the delayed pseudo noise codes and the third output signals from the ring counter means respectively associated with the delayed pseudo noise codes and outputting the resulting signals to the multiplying means.

6. A rake receiving apparatus in accordance with claim 1, wherein the searching means comprises:

multiplying means for multiplying the digital signal received from the analog/digital converting means as an input signal of the searching means by the signal generated from the first pseudo noise code generating means, thereby reversely sequencing the input signal as a first output signal;

combiner means for combining the first output signals sequentially output from the multiplying means to form a combined output;

threshold generating means for generating a predetermined threshold value;

comparing means for comparing the combined output from the combiner means with the threshold value output from the threshold generating means; and phase selecting means for selecting phases associated with the combined output of the combiner means which is not less than the threshold value.

7. A rake receiving apparatus in accordance with claim 6, further comprising;

clock counting means for counting clocks applied to both the comparing means and the phase selecting means, and sending the counted value to the phase selecting means when the combined output of the combiner means is not less than the threshold value.

8. A rake receiving apparatus for a direct sequence code division multiple access communication system comprising:

a radio frequency receiving unit for receiving a radio frequency signal via an antenna and converting the received radio frequency signal into an intermediate frequency signal;

analog/digital converting means for converting the analog signal, which is the intermediate frequency signal from the radio frequency receiving unit, into a digital signal;

digital down-converting means for frequency-down-converting the digital signal received frown the analog/digital converting means into a baseband signal;

sample delay means for receiving the baseband signal from the digital down-converting means, and sequentially outputting first output signals while delaying the first output signals a predetermined time interval;

first pseudo noise code generating means for generating and outputting first pseudo noise codes;

searching means for receiving the baseband signal from the digital down-converting means and the first pseudo noise codes from the first pseudo noise code generating means, thereby outputting pseudo noise code phases respectively as second output signals corresponding to multipaths;

combiner controlling means for receiving the second output signals from the searching means and outputting third output signals adapted to select as sequentially output from the sample delay means;

sample selecting means for receiving the first output signals sequentially output from the sample delay means and the third output signals from the combiner controlling means and selectively outputting the first output signals received from the sample delay means based on the third output signals received from the combiner controlling means;

a combiner for receiving the first output signals selectively output from the sample selecting means and combining the first output signals to form a fourth output signal;

second pseudo noise code generating means for receiving a fifth output signal from the combiner controlling means, thereby generating second pseudo noise codes;

demodulating means for receiving the second pseudo noise codes from the second pseudo noise code generating means and the fourth output signal from the combiner means, thereby demodulating data and outputting the demodulated data; and synchronization tracking means for receiving the second pseudo noise codes from the second pseudo noise code generating means and the fourth output signal from the combiner means, thereby recovering a synchronization of the first pseudo noise codes generated from the first pseudo noise generating means.

9. A rake receiving apparatus in accordance with claim 8, wherein the searching means comprises:

multiplying means for multiplying the baseband signal received from the digital down-converting means as an input signal of the searching means by the first pseudo noise codes generated from the first pseudo noise code generating means to reversely sequence the input signal to form sixth output signals;

integrating means for integrating the sixth output signals sequentially output from the multiplying means for a predetermined period of time to form an output;

threshold generating means for generating a predetermined threshold value;

comparing means for comparing the output from the integrating means as an integrated value with the predetermined threshold value, and generating a hold signal when the integrated value is less than the threshold value while determining an acquisition of the synchronization when the integrated value is not less than the threshold value;

a plurality of delay means for delaying the first pseudo noise codes output from the first pseudo noise code generating means by different delay values to form delayed pseudo noise codes;

ring counter means for outputting seventh output signals having a logic value of 1 while the remaining signals have a logic value of 0 to select one of the delayed pseudo noise codes having different delay values with the logic-1 signal at every integration interval so that the input signal can be reversely sequenced with the selected delayed pseudo noise code at every integration interval; and ANDing means for ANDing the delayed pseudo noise codes and the seventh output signals from the ring counter means respectively associated with the delayed pseudo noise codes and outputting the resulting signals to the multiplying means.

10. A rake receiving apparatus in accordance with claim 8, wherein the searching means comprises:

multiplying means for multiplying the baseband signal received from the digital down-converting means as an input signal of the searching means by the first pseudo noise codes generated from the first pseudo noise code generating means, thereby reversely sequencing the input signal to form sixth output signals;

combiner means for combining the sixth output signals sequentially output from the multiplying means together;

threshold generating means for generating a predetermined threshold value;

comparing means for comparing the output from the combiner means with the threshold value output from the threshold generating means; and phase selecting means for selecting phases associated with the output of the combiner means which is not less than the threshold value.

11. A rake receiving apparatus in accordance with claim 10, further comprising:

clock counting means for counting clocks applied to both the comparing means and the phase selecting means, and sending the counted value to the phase selecting means when the output of the combiner means is not less than the threshold value.

* * * * *